April 3, 1962
R. A. KEECH
3,027,719
POSITIVE DISPLACEMENT VARIABLE SPEED
HYDRAULIC POWER TRANSMISSION
Filed May 6, 1960
2 Sheets-Sheet 1
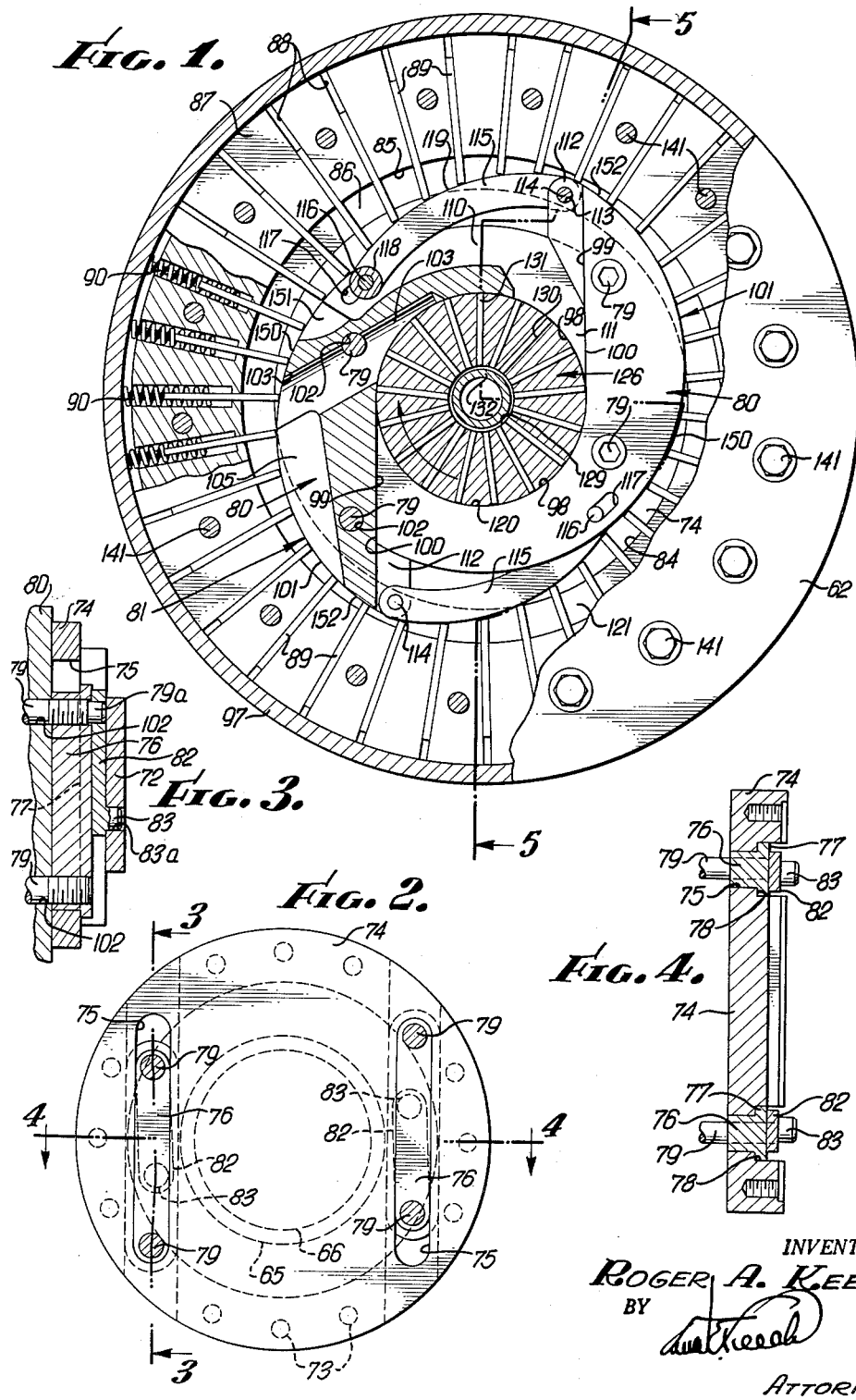
INVENTOR.
ROGER A. KEECH
BY
ATTORNEY.

April 3, 1962
R. A. KEECH
3,027,719
POSITIVE DISPLACEMENT VARIABLE SPEED
HYDRAULIC POWER TRANSMISSION
Filed May 6, 1960
2 Sheets-Sheet 2
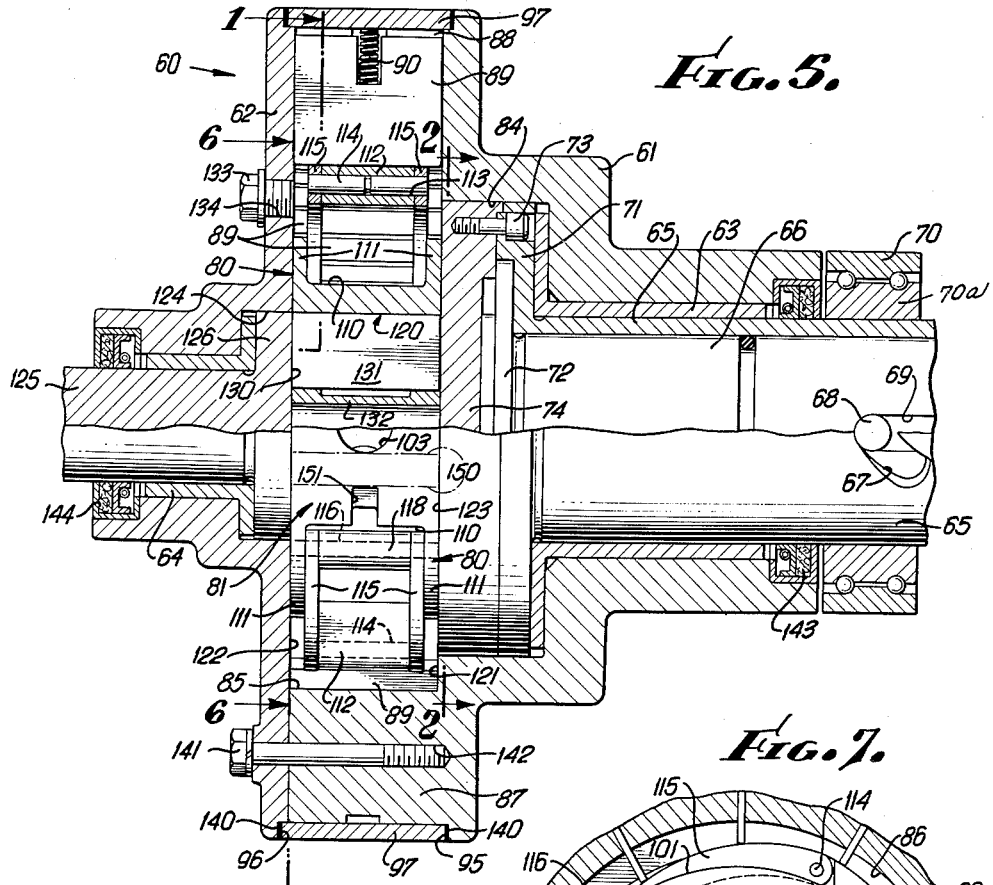
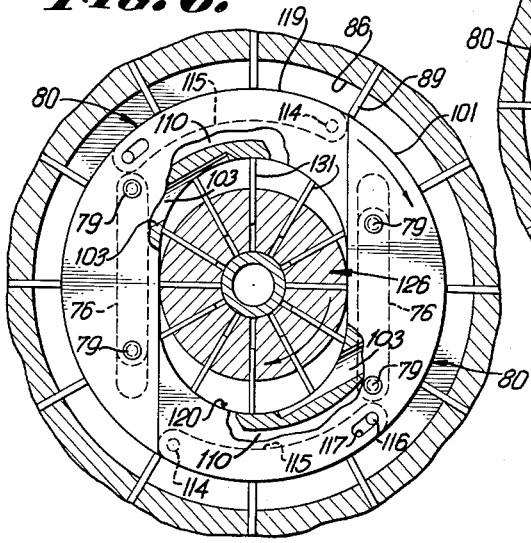
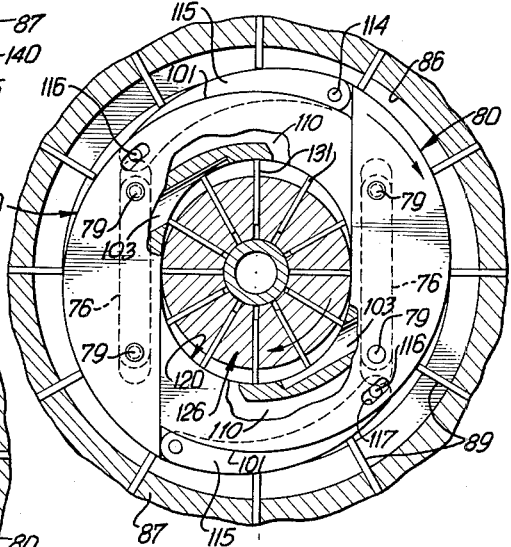
INVENTOR.
ROGER A. KEECH
BY
ATTORNEY.

United States Patent Office 3,027,719
Patented Apr. 3, 1962

3,027,719
POSITIVE DISPLACEMENT VARIABLE SPEED
HYDRAULIC POWER TRANSMISSION
Roger A. Keech, Glendale, Calif., assignor of twenty-five percent to Dana E. Keech, Los Angeles, Calif.
Filed May 6, 1960, Ser. No. 27,322
11 Claims. (Cl. 60—53)

This invention relates to hydraulic variable speed power transmissions and particularly to such a transmission making use of positive hydraulic displacement.

It is an object of this invention to provide a simple, compact and inexpensive variable-speed power transmission adaptable for a wide variety of uses.

Another object is to provide such a transmission which operates by the direct connection of a hydraulic pump to a hydraulic motor and concurrently reversely modifies the relative volumetric capacities of the pump and motor to govern the speed ratio between the two.

A further object is to provide such a transmission in which the principal operating parts of both said pump and motor are contained within a single cylindrical cavity within a housing and in which the motor rotor comprises two relatively slidable elements which unite to provide and determine the contour of not only a pump chamber formed internally therein but also a motor chamber formed externally thereof and to provide passage means connecting said pump chamber and motor chamber for the circulation of operating liquid in the hydraulic rotation of said pump motor.

Still another object is to provide a novel hydraulic motor-pump having a means for varying the volumetric capacity of the operating chamber whereby this chamber will at all times be symmetrically disposed relative to the axis of the rotor.

The manner of accomplishing the foregoing objects as well as further objects and advantages will be made manifest in the following description taken in connection with the accompanying drawings in which:

FIG. 1 is a diagrammatic transverse sectional view of a preferred embodiment of the invention taken on the line 1—1 of FIG. 5.

FIG. 2 is a detailed sectional view taken on the line 2—2 of FIG. 5 and illustrating the assembly plate on which the J elements of the adjustable driven motor rotor of the invention are mounted.

FIG. 3 is a detailed fragmentary sectional view taken on the line 3—3 of FIG. 2.

FIG. 4 is a transverse horizontal sectional view taken on the line 4—4 of FIG. 2.

FIG. 5 is a longitudinal vertical sectional view taken on the line 5—5 of FIG. 1.

FIG. 6 is a transverse diagrammatic sectional view of reduced scale taken on the line 6—6 of FIG. 5 and illustrating the driven motor rotor of the invention in extreme expanded relation as is the case when there is a drive relation in the invention of 1:1 between the drive shaft and driven shaft thereof.

FIG. 7 is a view simlar to FIG. 6 showing the driven rotor of the invention in an intermediate stage of expansion as is the case when there is an approximate drive ratio of 2.5:1 between the drive shaft and driven shaft of the invention.

Referring specifically to the drawings the invention is there shown as preferably embodied in a transmission 60 including a case 61 having a cover 62, the case providing a bearing 63 and the cover providing a bearing 64, said bearings being coaxial.

Journaling in bearing 63 is a hollow driven shaft 65 inside which a control shaft 66 is rotatably confined. The hollow shaft 65 has an oblique spirally related slot 67 formed therein for receiving a pin 68, which also passes through a longitudinal straight slot 69 formed in the control shaft 66. A ball bearing collar 70 surrounds the driven shaft 65 and the inner race 70a thereof connects with pin 68 and provides a means of shifting this pin longitudinally to cause a slight degree of relative rotation between the driven shaft 65 and control shaft 66 to control the drive ratio produced in the operation of the transmission 60.

The inner end of hollow shaft 65 has an external flange 71 which is hollowed out to receive an external flange 72 on the inner end of the control shaft 66. Secured by bolts 73 to the peripheral portion of flange 71 is a driven rotor assembly plate 74. This plate has a pair of parallel slots 75 which extend entirely through this plate, in which slots are mounted control slides 76 which are about ½ inch shorter than said slots, and have shoulders 77 which overlap shoulders provided by recesses 78 formed in outwardly disposed portions of said slots.

Secured rigidly to inner faces of slides 76 by Allen screw 79 are two like J elements 80 of an adjustable pump driven rotor 81. Pivoted on a pin end 79a provided on one of the screws 79 of each of the elements 80 is a short link 82 having a pin 83, formed integral therewith, which extends from the opposite end of said link into a suitable hole 83a provided to receive the same in the flange 72 on the inner end of control shaft 66. Thus it will be noted that rotation of the control shaft 66 relative to the hollow driven shaft 65 by axial movement of the ball bearing collar 70 will cause an opposite shifting of the slides 76 in the slots 75 and a corresponding shifting of the J elements 80 of the driven rotor relative to each other.

The driven motor rotor elements 80 are thus adapted to be shifted between their relative positions shown in FIG. 1 and the relative positions in which they are shown in FIG. 6 in accomplishing changes in the drive ratio effected by the transmission 60.

The case 61 has a counterbore 84 in which the flange 71 and plate 74 are rotatably received so that the inner face of said plate is radially flush with the radial face provided by a second counterbore 85 which provides a cylindrical operating chamber 86 for the operation of the driven rotor 81 and the elements 80 of that rotor make a close sliding fit with the radial faces of said chamber provided on one side by the counterbore 85 and assembly plate 74 and, on the other side, by the cover 62.

The counterbore 85 in the case 61 leaves a heavy peripheral stator block 87 surrounding said counterbore, this block being provided with a large odd number of radial slots 88 for receiving stator vanes 89. The outer end of each of the slots 88 is bored to receive an expansion spring 90 which fits into a notch in the vane 89 mounted in said slot so as to constantly bias that vane radially inwardly.

The case 61 has an annular peripheral recess 95 and the cover 62 has a corresponding recess 96, and a cylindrical ring 97 fits into these recesses and surrounds the stator block 87 of the case 61 so as to make a sealing fit with the recesses 95 and 96 while holding the vanes 89 and springs 90 in assembled relation as above described.

Each of the J elements 80 of the pump driven rotor 81 has a concave semi-cylindrical surface 98, parallel flat surfaces 99 and 100 tangential with surface 98 and a convex semi-cylindrical external surface 101. Each of the J elements 80 also has holes 102 which receive the aforementioned Allen screws 79 and it has a hole 103 of somewhat larger diameter which is bored inwardly from the surface 101 into approximately tangential penetrating relation with the concave surface 98 to provide a liquid intake passage. An extension 105 of passage 103 is formed by routing material from said element in a direction approximately tangential with the external semi-cylindrical surface 101. A liquid discharge passage 110 is also formed by routing away the material of the element, this passage extending upwardly from the surface 98 and connecting with the surface 100 throughout the length of the latter, and connecting with and extending a substantial distance along the external semi-cylindrical surface 101. A pair of walls 111 are thus provided on each J element on opposite sides of the passage 110.

Formed integrally with each of the J sections 80 to extend from the flat surface 99 thereof near the juncture of that surface with surface 101, is a link mounting lug 112 having an axial bore 113 for receiving a pin 114. This pin extends from opposite sides of the lug 112 and has mounted thereon adjacent ends of a pair of externally convex arcuate links 115. These links lie in planes just within walls 111 and the other ends of said links are connected by a pin 116 which extends outwardly from said links into slots 117 formed in walls 111. Pin 116 also passes through a tubular sleeve 118 which lies between and spaces links 115.

The links 115 have rounded ends and outer arcuate surfaces 119 which have the same radius as the surfaces 101 on elements 80 and these links are so mounted on these elements that when the latter are in their extreme contracted relation as shown in FIG. 6, the surfaces 119 coincide with the surfaces 101 to form a single cylindrical surface concentric with the driven shaft 65 of the invention. It is to be noted in FIG. 1 that in the relationship there shown between the elements 80, portions of the external arcuate surfaces 101 of these elements unite with the external arcuate surfaces 119 of the links 115 to give the motor rotor 81 an ellipsoidal external configuration.

With the elements 80 related as just described, and shown in FIG. 1, the semi-cylindrical concave surfaces 98 of the two elements unite to form a cylindrical pump rotor chamber 120. This chamber of course is converted into one having an ellipsoidal form as soon as the elements 80 are shifted relative to each other, even the slightest amount, from their positions shown in FIG. 1 towards their positions shown in FIG. 6.

The axial thickness of stator block 87 determines the axial spacing of flat radial surfaces 121 and 122, the first of which is provided by counterbore 85 of case 61 and the inner face 123 of rotor mounting plate 74, and the second of which is provided by the inner face of cover 62. These radial surfaces 121 and 122 form the ends of cylindrical operating chamber 86 of the transmission 60. A cylindrical recess 124 is formed concentric with bearing 64 in the inner face 122 of the cover 62 which is concentric and equal in diameter with pump chamber 120 when the latter is cylindrical as shown in FIG. 1.

Journaling in bearing 64 is a drive shaft 125 having a cylindrical pump drive rotor 126 mounted on its inner end, said rotor having an external diameter permitting it to freely rotate within recess 124 and pump chamber 120. The rotor 126 also has a bore 129 and is provided with an odd numbered series of equally spaced radial vane slots 130 in which a like number of vanes 131 are slidably mounted.

Fitting into bore 129 is a tubular sleeve 132 which acts as a retainer for retaining the vanes 131 outwardly in their respective slots 130. The latter slots are coextensive in axial dimension with the motor rotor 81 and the vanes 131 are also coextensive with said rotor and are centrifugally maintained in slidable relation with the chamber 120 by rotation of the drive shaft 125.

The cover 62 is provided with a filling plug 133 which is screwed into a suitable threaded aperture 134 provided in said cover and which is removed therefrom in order to fill all the open spaces within the operating chamber 86 with a body of operating liquid which is preferably a heavy lubricating oil.

Suitable gaskets 140 are interposed between opposite edges of ring 97 and recesses 95 and 96 when the cover 62 is assembled on case 61, and the cover is secured to said case by a series of cap screws 141 which screw into threaded holes 142 provided in the stator 87 of the case 61.

Provided in the case 61 at the outer end of bearing 63 is a suitable oil seal 143 while a similar seal 144 is provided in the cover 62 at the outer end of bearing 64.

*Operation*

The transmission 60 provides a transmission drive ratio between the drive shaft 125 and the driven shaft 65 which varies between the ratio of infinity to 1 and the ratio of 1:1. The relative positioning of the elements 80 of the driven rotor 81 shown in FIG. 1 produces the first of these extreme ratios. The positioning of said elements as in FIG. 6 produces the ratio at the opposite extreme. Intermediate positions of the elements 80 produce corresponding graduations in the drive ratio between these two extremes. Thus the relative position between elements 80 shown in FIG. 7 results in a drive ratio of approximately 2.5:1.

These changes in drive ratio result from changes in the relationship between the volumetric capacity of the pump of the invention to deliver liquid and the volumetric capacity of the motor thereof to receive the same. In FIG. 1 the volumetric capacity of the pump is zero while that of the motor is at its maximum. Thus the drive ratio of infinity to 1. In FIG. 6 the volumetric capacity of the pump is at its maximum while the volumetric capacity of the motor is zero. In other words the motor is unable to receive any operating liquid from the pump or discharge any to the pump. As the pump, in this position, must pump operating liquid in order for the drive rotor 126 to rotate in the chamber 120 thereof, the situation shown in FIG. 6 results in locking the pump drive rotor 126 against rotation in its driven rotor 81. The driven rotor 81, however, is here free to rotate within the motor vanes 89 with a minimum of friction as the external profile of the driven rotor 81 is now cylindrical.

Some ambiguity has been found unavoidable in choosing terminology for describing the transmission 60, this arising from the fact that the mechanism referred to hereinabove as the driven rotor 81 is indeed a driven rotor of a certain complex of parts in the transmission which may be referred to as the motor of the transmission. At the same time the so-called driven rotor 81 of the transmission truly forms the stator or what is ordinarily considered the stator of another complex of elements which forms a vane pump in the transmission 60. Reference to the central rotor 126 of the pump complex of the transmission as a drive rotor and to the rotor 81 as a driven rotor clearly distinguishes between these mechanisms and avoids the difficulty of trying to use definitive language and specific reference numerals for distinguishing the pump complex from the motor complex, as these two complexes are actually indistinguishable as they merge one into the other in their common use of the driven rotor 81.

In claiming the invention however and particularly in defining certain subcombinations therein believed to be patentable, the so-called driven rotor 81 may be referred to as the stator of the pump complex of the invention or as the rotor of the motor complex thereof.

While capable of operation by rotating the drive shaft 125 in either direction, the transmission 60 is primarily designed as disclosed for clockwise rotation of this shaft. This is because when thus operated the vanes 131 always ride off of the thin edges formed at the junctures of concave surfaces 98 and flat surfaces 100 of the J elements 80. Clockwise rotation of shaft 125 when the elements 80 are related as shown in FIG. 1 with the pump chamber 120 having a true cylindrical shape, as already stated produces no pumping action so that no liquid is delivered from the pump complex to the motor complex to cause the driven rotor 81 to rotate. As no circulation can take place in the liquid occupying the open spaces in the motor complex of the transmission while the rotor 81 is thus adjusted, the driven shaft 65 is effectively locked against rotation. At the same time there is practically no resistance set up in the transmission 60 to the free rotation of the drive shaft 125.

Suppose now the ball bearing ring 70, the inner race 70a of which makes a direct connection with the pin 68 in a manner well known in the art, is shifted axially to the right from the position in which it is shown in FIG. 5 to symmetrically shift the elements 80 away from each other and thus symmetrically enlarge the pump operating chamber 120, for instance as shown in FIG. 7, operating liquid is sucked from the intake passages 103 of the respective driven rotor elements 80 and delivered to the discharge passages 110 of said elements. This causes a rise in pressure in the operating liquid occupying passages 110 of said elements whereas the fluid pressure is reduced in the intake passages 103. This results in a clockwise rotation of driven rotor 81 which results from the ellipsoidal outline of said driven rotor as the elements 80 thereof are presently adjusted. This response of the driven rotor 81 to the development of fluid pressures in passages 110 of said rotor and of vacuum in intake passages 103 thereof, is facilitated by four areas of limited circumferential length two of which are provided on each of the elements 80 and each of which areas when engaged by one of the vanes 89 forms a substantially liquidtight seal blocking a circumferential passage of operating liquid between that particular vane and the rotor 81. Each of the elements 80 for instance has a minimum radius area 150 which is disposed circumferentially between the intake passage 103 of said element and a narrow channel 151 milled into said element 80 to form a short extension of the passage 110 of said element. The other sealing area 152 provided on each of the elements 80 is immediately adjacent the outer edge of flat face 99 of that element and lies between that edge and the adjacent end of passage extension 105 of said element.

It is to be noted that peripheral sealing areas 152 on driven rotor 81, whenever the latter is adjusted to have an ellipsoidal peripheral outline, are located close to the points where said outline has a maximum radius, whereas sealing areas 150 under the same circumstances are located close the points on said periphery of the smallest radius for that given configuration of said rotor. From this it is seen that clockwise rotation of the drive rotor 126 and consequent extraction of liquid from intake passages 103 and delivery of this liquid into discharge passages 110 produces resultant pressures against outer portions of flat element faces 99 which effects clockwise rotation of the driven rotor 81.

It is to be noted that each of the peripheral sealing areas 150 and 152 on the driven rotor 81 preferably has a circumferential dimension equal to the maximum circumferential gap between any adjacent pair of vanes 89 when these are in contact with the driven rotor 81.

While only a single preferred embodiment of the invention is illustrated and described herein, it is to be understood that many changes and modifications may be made in this without departing from the spirit of the invention or the scope of the appended claims.

The claims are:

1. In combination: a body having a cylindrical chamber; bearings concentric with said chamber at opposite ends of the latter; a drive shaft journaling in the first of said bearings; a hollow driven shaft journaling in the second of said bearings; a control shaft axially confined within said hollow shaft; externally actuated means for rotationally adjusting said control shaft relative to said hollow shaft while the latter is rotating; a motor rotor assembly plate fixed on the inner end of said hollow shaft; a motor rotor comprising two like elements slidably mounted on said plate for parallel transverse translation relative to each other; means connecting said elements to said control shaft for controlling said translation through said control shaft, said elements respectively having J-shaped surfaces meeting to form a pump chamber which is cylindrical and concentric with the axis of said motor chamber when said elements are in a given relatively contracted relation and which is ellipsoidal and symmetric with said axis when said elements are in a relatively expanded relation, said elements having convex external vane engaging faces which comprise segments of a cylindrical surface concentric with said axis when said elements are in a given relatively expanded relation; vane guides articulately connected at their opposite ends to said respective elements to peripherally bridge gaps existing between said convex faces, said body including a stator comprising a vane-mounting annulus surrounding said motor chamber, said annulus having equally spaced radial recesses opening inwardly into said motor chamber; stator vanes slidably mounted in said recesses; yieldable means urging said vanes inwardly into engagement with said motor rotor; a cylindrical pump rotor rotatably fitting within said pump chamber, said pump rotor having radial slots formed therein; and pump vanes slidably mounted in said slots for slidable engagement with said pump chamber, there being intake and discharge passages formed in said elements to conduct operating liquid respectively from said motor chamber to said pump chamber and vice versa.

2. In combination: a body providing a closed cylindrical motor chamber having radial end walls; a motor rotor mounted within and axially coextensive with said chamber, said rotor being rotatable on the axis of said chamber and comprising two J-shaped elements having semi-cylindrical concave faces and which fit together in slidable concave-face-to-cconcave-face relation to provide a cylindrical pump chamber concentric with said motor chamber when said elements are in a given relatively contracted relation; control means for symmetrically shifting said elements in sliding relation with each other between said relatively contracted relation and a given relatively expanded relation in which said pump chamber will be transversely elongated to give it an ellipsoidal form, external semi-cylindrical surfaces being provided on said elements which, when said elements are so expanded, united to produce a peripheral cylindrical surface on said rotor coaxial with the axis of said chambers; a series of uniformly spaced radial motor vanes slidably mounted in said body to be yieldably urged radially inwardly into said motor chamber into slidable relation with said external surfaces of said motor rotor and in sliding contact with said radial end walls; link means connecting said elements and bridging diametrically opposite faults produced in said peripheral cylindrical surface when said motor rotor elements are not in their given relatively expanded relation aforesaid, to smoothly guide said vanes from contact with one element into contact with the other; a cylindrical pump rotor rotatably mounted within said pump chamber coaxially with said chamber axis; a series of uniformly spaced radial pump vanes slidably mounted in said pump rotor and centrifugally urged radially outwardly into said pump chamber and into slidable relation with the internal surfaces of said pump chamber and with the end walls of said pump chamber; means for driving said pump rotor; means driven by said motor rotor for conducting power therefrom; and a body of operating liquid filling the empty space in said two chambers, there being passages provided in said motor rotor for accommodating the circulation of said liquid between circumferentially spaced points in said respective chambers responsive to the pumping action of said pump rotor and vanes and thereby causing said motor rotor to rotate.

3. In combination: an expansive-contractive stator including two J-shaped elements placed concave-face-to-concave-face to produce an ellipsoidal chamber enclosed by said elements; a rotor provided with radially shiftable vanes and mounted in said chamber on an axis centrally located therein; means for oppositely shifting said elements in sliding relation with each other to change the length of said chamber while maintaining said chamber in symmetrical relation with said axis; and means for closing opposite ends of said chamber to confine a liquid therein in a hydrodynamic relation with said rotor, said vanes and the confining surfaces of said chamber, there being passages provided in said elements for admission of liquid to diametrically opposite portions of said chamber where rotation of said rotor in a given direction concurs with expanding spaces between adjacent vanes, there also being passages provided in said elements for the discharge of liquid from other diametrically opposite portions of said chamber where said rotation of said rotor concurs with contracting spaces between adjacent vanes.

4. A combination as in claim 3 in which the concave faces within said J-shaped elements are semi-cylindrical and said elements are shiftable relative to each other, at one point in their movement, to reduce said ellipsoidal chamber to a cylinder concentric with said axis.

5. A combination as in claim 3 which has means for driving said rotor as a pump to cause liquid to be sucked into said chamber through said admission passages and discharged through said discharge passages; and a liquid motor connected with said admission and discharge passages and driven by a circulation of fluid between said motor and said pump at a drive ratio varying with the change in volume of said pump chamber.

6. A combination as in claim 5 in which the stator of said pump forms the rotor of said motor and presents an ellipsoidal periphery of variable length to a circular series of radial motor vanes provided in a circular motor stator surrounding said motor rotor.

7. In combination: a body having a cylindrical chamber with flat radial end walls; a cylindrical drive rotor rotatably mounted within said chamber and coaxially therewith; a series of equally spaced radially slidable pump vanes provided on said rotor; a driven rotor surrounding said drive rotor and rotatably mounted in said chamber coaxially therewith, said driven rotor providing a pump chamber in which said drive rotor is confined, said pump chamber having an ellipsoidal configuration disposed symmetrically relative to said axis, said driven rotor also having an ellipsoidal peripheral configuration; and a series of equally spaced radial vanes mounted slidably in said body to be yieldably extended inwardly into contact with the peripheral surface of said driven rotor, there being passages provided in said driven rotor for conducting liquid from the portion of said cylindrical chamber located outside said driven rotor into said pump chamber and from said pump chamber back to said cylindrical chamber portion whereby liquid is drawn into said pump chamber by rotation of said pump rotor and discharged from said pump chamber into the portion of said cylindrical chamber exterior of said driven rotor so as to cause a rotation of said driven rotor within said cylindrical chamber at a different rate than the rate of rotation of said pump rotor.

8. In combination: a pump rotor provided with a series of equally spaced radially slidable vanes; a pump stator providing an ellipsoidal operating chamber for said rotor and vanes, said chamber being balanced symmetrically with the axis of said rotor; means for varying the volumetric content and length of said pump chamber to vary the performance of said rotor therein, said rotor functioning as a pump rotor and said stator operating both as a pump stator and as a motor rotor having an ellipsoidal periphery which varies in length conversely with the variation aforesaid in the length of said pump chamber; and a motor housing providing a circular motor chamber enclosing said motor rotor and providing a circular series of motor vanes radially slidable and yieldably urged inwardly into engagement with said motor rotor, there being liquid circulating passages in said motor rotor connecting said pump chamber to said motor chamber for causing rotation of said motor rotor by liquid delivered from said pump chamber to said motor chamber.

9. A combination as in claim 7 including means embodied in said driven rotor rendering it adjustable to vary conversely the major dimensions of the internal and external ellipsoidal configurations of said driven rotor, and thus vary the drive ratio between said drive rotor and said driven rotor.

10. A combination as in claim 9 including means operable, while said rotors are rotating as aforesaid, to accomplish said adjustment of said driven rotor to vary said drive ratio.

11. A combination as in claim 10 in which manual means is provided for operating said adjustment means from outside said body.

References Cited in the file of this patent
UNITED STATES PATENTS

| | | |
|---|---|---|
| 2,170,786 | McElroy et al. | Aug. 22, 1939 |
| 2,589,362 | Foster | Mar. 18, 1952 |
| 2,755,740 | McKean | July 24, 1956 |